(12) United States Patent
Zhang et al.

(10) Patent No.: US 9,481,499 B2
(45) Date of Patent: Nov. 1, 2016

(54) SECURITY WRAP

(71) Applicant: Johnson Electric S.A., Murten (CH)

(72) Inventors: Libing Zhang, Sharon, MA (US);
Dominic John Ward, Carisbrooke (GB)

(73) Assignee: JOHNSON ELECTRIC S.A., Murten (CH)

( * ) Notice: Subject to any disclaimer, the term of this patent is extended or adjusted under 35 U.S.C. 154(b) by 449 days.

(21) Appl. No.: 13/952,116

(22) Filed: Jul. 26, 2013

(65) Prior Publication Data
US 2014/0027028 A1  Jan. 30, 2014

(30) Foreign Application Priority Data

Jul. 27, 2012 (GB) .................................. 1213449.0
Aug. 20, 2012 (GB) .................................. 1214818.5

(51) Int. Cl.
*H05K 7/00* (2006.01)
*B65D 65/22* (2006.01)
*G06F 21/86* (2013.01)

(52) U.S. Cl.
CPC ............... *B65D 65/22* (2013.01); *G06F 21/86* (2013.01)

(58) Field of Classification Search
CPC ... H05K 5/0269; H05K 7/142; G06K 19/077
USPC ................ 361/736–737, 816, 818, 760, 749, 361/792–795; 174/254–260
See application file for complete search history.

(56) References Cited

U.S. PATENT DOCUMENTS

| | | | | |
|---|---|---|---|---|
| 5,159,629 A * | 10/1992 | Double | ................... | G06F 21/87 206/807 |
| 5,858,500 A * | 1/1999 | MacPherson | ............. | E05G 1/14 264/259 |
| 7,065,656 B2 * | 6/2006 | Schwenck | ............... | G06F 21/87 713/194 |
| 7,549,064 B2 * | 6/2009 | Elbert | ..................... | G06F 21/87 340/550 |
| 8,411,448 B2 * | 4/2013 | Shi | ......................... | G06F 21/87 174/50 |
| 2002/0084090 A1 | 7/2002 | Farquhar et al. | | |

FOREIGN PATENT DOCUMENTS

GB      2412996 B      12/2005
WO    WO 01/59544 A2    8/2001

* cited by examiner

*Primary Examiner* — Tuan T Dinh
(74) *Attorney, Agent, or Firm* — Muncy, Geissler, Olds & Lowe, P.C.

(57) ABSTRACT

An electronic device is protected from unauthorized access by use of a security wrap which comprises at least a substrate, a security screen, a layer of adhesive and decoy pattern. The security screen is disposed over one side of the substrate and includes a pair of screen terminals and a conductive path between the pair of screen terminals. The layer of adhesive bonds the first side of the substrate to the electronic component with the security screen sandwiched there between. The decoy pattern is at least partially impervious to X-ray and overlays said security screen.

6 Claims, 6 Drawing Sheets

SECURITY WRAP

CROSS REFERENCE TO RELATED APPLICATIONS

This non-provisional patent application claims priority under 35 U.S.C. §119(a) from Patent Application No. 1213449.0 filed in United Kingdom on Jul. 27, 2012 and from Patent Application No. 1214818.5 filed in United Kingdom on Aug. 20, 2012. The entire contents of the aforementioned patent applications are hereby incorporated by reference for all purposes.

FIELD OF THE INVENTION

This invention relates to a security device for an electronic circuit and in particular, to a security wrap for preventing unauthorized access to a designated portion of the circuit.

BACKGROUND OF THE INVENTION

Protecting electronic circuits from unauthorized access is an important consideration when designing apparatus that may contain sensitive and/or confidential information, e.g., point of sale (POS) devices that collect confidential information about credit cards or bank account details when a purchase is being made.

Recently, security wraps have been used for the protection of such devices. The security wrap forms a part of the device's security system and detects an attempt to physically access the protected portion of the device. The security wrap physically covers the electronic components being protected, referred to as the parent device, which may be a portion of a PCB, the entire PCB or components like a smart card connector, a microprocessor and the like. The security wrap may be flexible so as to be able to be wrapped around the parent device, further reducing the opportunities to access the components.

The security wrap has one or more conductors connected between corresponding pairs of screen terminals, forming a security screen. The screen termninals are connected to terminals of an alarm circuit of the parent device. Severing a connector triggers an alarm condition. The function of the alarm circuit is not a part of the instant invention and depends on the security response of the device being protected which may range from a visual and/or audible indication, to shutting down of the device, disabling the device or in an extreme response to total destruction of the device or the components being protected.

Prior art security wraps are made with etched copper circuitry or flexible printed circuits (FPC). They can also be fabricated by additive method such as polymer thick film (PTF) technology using printed conductors. Typically the circuits consist of substrate, conductor layers, adhesive layer, and/or dielectric layers.

However, the use of x-ray detection methods can be used to reveal the conductor traces, the circuitry layout and the location of terminal contact points. With this information, hackers may use a drill or laser cutting to by-pass the security circuitry to access IC chips and other sensitive electronic components on the board.

Another problem with existing products is that a flexible security wrap is a relatively simple circuitry; a single layer conductor layout typically satisfies the design requirements. While in theory it is possible to use a thick metal plate to block x-ray detection, this method is not practical in point of sale (POS) devices due to weight, space and flexibility constraints. In order to improve the security coverage by conductors, one approach is to use double-layer or multi-layer circuitry, or stack several security screens together. While the security level indeed can increase, the circuitry cost increases significantly with each additional security screen layer. In addition, multi-layer or multi-stacking of circuitry leads to reduced flexibility due to added thickness. It may pose reliability issues when wrapping or bending around a board or component.

SUMMARY OF THE INVENTION

Hence, there is a need for a new security wrap in which the design of the security screen can not be determined using known x-ray detection methods.

This is achieved by the present invention by combing both actual flexible security conductor layers with non-conductive layers, with both showing under x-ray detection. In this case, it would effectively increase the circuitry coverage and add circuitry layout complexity, which renders more challenges for hackers to decipher the true conductor layout. Alternatively, this is also achieved by using a security screen composed of conductors which are transparent to x-rays.

Accordingly, in one aspect thereof, the present invention provides a security wrap, for preventing unauthorized access to a component of an electronic device having an alarm circuit, comprising: comprises at least a substrate, a security screen, a layer of adhesive and decoy pattern. The security screen is disposed over one side of the substrate and includes a pair of screen terminals and a conductive path between the pair of screen terminals. The conductive path has a pair of screen terminals arranged to make contact with alarm terminals of an alarm circuit. The layer of adhesive bonds the first side of the substrate to the electronic component with the security screen sandwiched there between. The decoy pattern is at least partially impervious to X-ray and overlays said security screen.

Preferably, the decoy pattern is intermittently impervious to X-Ray so as to create a predetermined image when X-rayed.

Preferably, the decoy pattern includes a pattern formed on said substrate.

Alternatively, the security wrap further comprises a layer disposed between first side of said substrate and said security screen, wherein the decoy pattern includes a pattern formed on said layer and insulated from the conductive path of said security screen.

Alternatively, the security wrap further comprises a layer disposed over a side of said security screen remote from said substrate, wherein the decoy pattern includes a pattern formed on said layer and insulated from the conductive path of said security screen.

Alternatively, the security wrap further comprises a layer disposed over the second side of said substrate, wherein the decoy pattern includes a pattern formed on said layer.

Alternatively, the security wrap further comprises a solid conductor layer between the first side of said substrate and said security screen and insulated from the conductive path of said security screen.

Alternatively, the security wrap further comprises a dielectric layer disposed between said security screen and the first side of said substrate; and a second security screen disposed between said dielectric layer and the first side of said substrate and including a second pair of screen terminals and a second conductive path between the second pair of screen terminals.

Preferably, the conductive path of said security screen and the second conductive path of said second security screen are connected in series with each other.

Alternatively, the security wrap further comprises a second security screen disposed over the second side of said substrate and including a second pair of screen terminals and a second conductive path coupled between the second pair of screen terminals; and a dielectric layer disposed over said second security screen.

Preferably, the conductive path of said security screen is transparent to X-Ray.

Preferably, said substrate includes a flexible printed circuit board having conductive layer fixed thereon; and said security screen includes the conductive path formed by etching the conductive layer fixed on said substrate.

Preferably, said security screen includes the conductive path formed from a thermoset conductive ink in a printing process.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
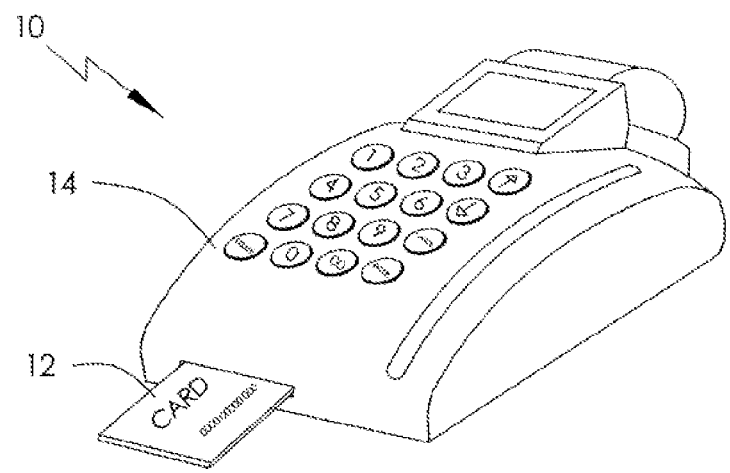
FIG. 1 is illustrates an electronic device inside which a security wrap is fitted.
Figure 2:
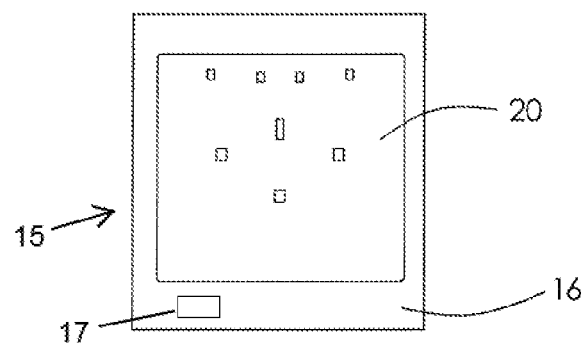
FIG. 2 illustrates a single surface security wrap applied to a circuit board of the device of FIG. 1.

FIG. 1 illustrates a POS device 10 as an example of where the security wrap is used. POS device 10 has a slot for receiving a card 12 containing confidential information such as account details, etc. The device 10 also has buttons 14 for entering details and instructions for controlling the device. Inside the POS 10 is an electronic component 15 comprising circuit board 16 (shown in FIG. 2) with components 17 including a memory chip and/or a microprocessor (MCU) which may contain or momentarily access confidential information. A security wrap 20 may be placed over the entire circuit board 16 or over just a portion of the board 16, as will be described herein after, depending on system requirements. FIG. 2 shows the security wrap 20 as a single surface version, covering a large portion of the PCB 16 of the POS device 10. The PCB 16 forms the parent device to be protected and the security wrap 20 is bonded to the PCB 16. Alternate forms of security wraps 20 may be used depending on the situation and desired security level, such as open face or full face. An open face wrap is adhered to a device with a top face and sides only.

Figure 3:
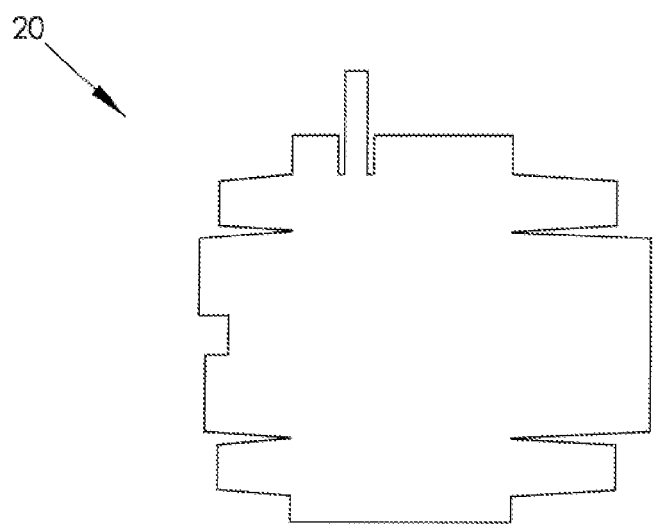
FIG. 3 is a schematic illustration showing an exemplary full face security wrap in an unwrapped form.

FIG. 3 is a schematic illustration showing an exemplary full face security wrap 20 in an unwrapped form. The illustration is a plan view of the security wrap 20 having an opaque substrate with the conductor layers on the reverse side and remain hidden after assembly to a parent device. A full face wrap 20 is adhered around a device with top and bottom faces and sides.

Figure 4:
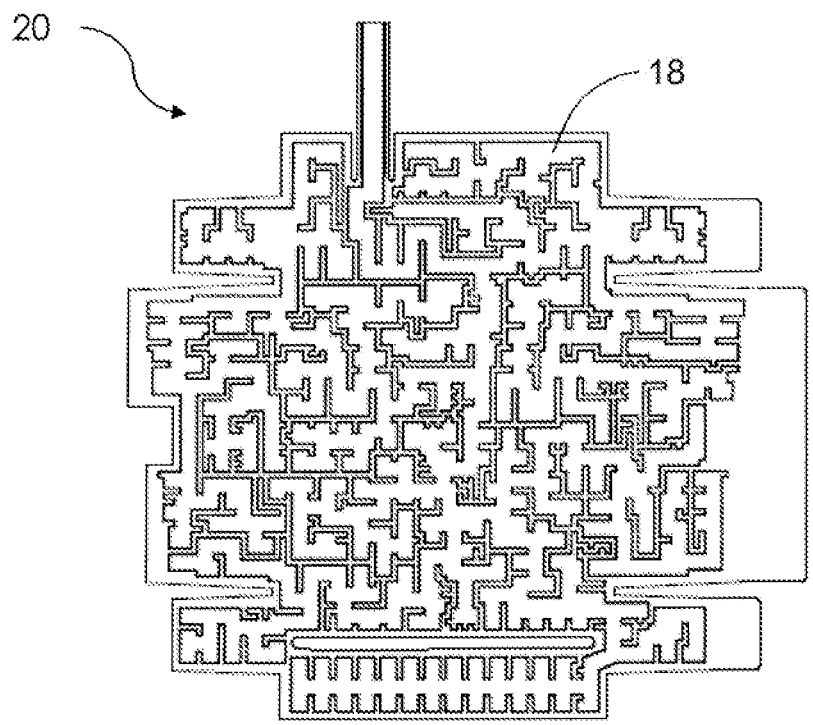
FIG. 4 is a schematic illustration showing an exemplary circuitry layout revealed under x-ray detection.

FIG. 4 is a schematic illustration showing an exemplary circuitry layout 18 revealed under x-ray detection. For this single layer conductor, there are plenty spaces between the traces, which makes it vulnerable for hackers to cut or drill in the non-covered areas.

Figure 5:
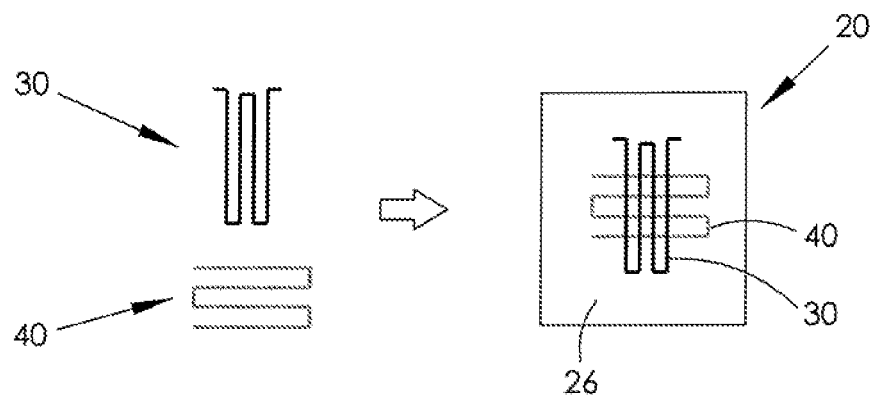
FIG. 5 is a schematic illustration showing a single-layer metallic conductor with a non-conductive layer, which under x-ray is displayed as complex stacked circuits.

FIG. 5 is a schematic illustration showing a single-layer conductor (may also be referred to as a security screen) 30 with a non-conductive layer (may also be referred to as a decoy layer) 40, which under x-ray is displayed as complex stacked circuits (may also be referred to as multi-layer circuit pattern or security circuit) 26. The conductor 30 may be a metallic conductor. In FIG. 5, the use of metallic conductors 30 combined with x-ray imageable non-conductive patterns 40, produce the multi-layer circuit patterns 26 in the x-ray image. This would increase the tamper difficulty significantly and deter hackers' attempt to bypass them with mechanical methods.

Figure 6:
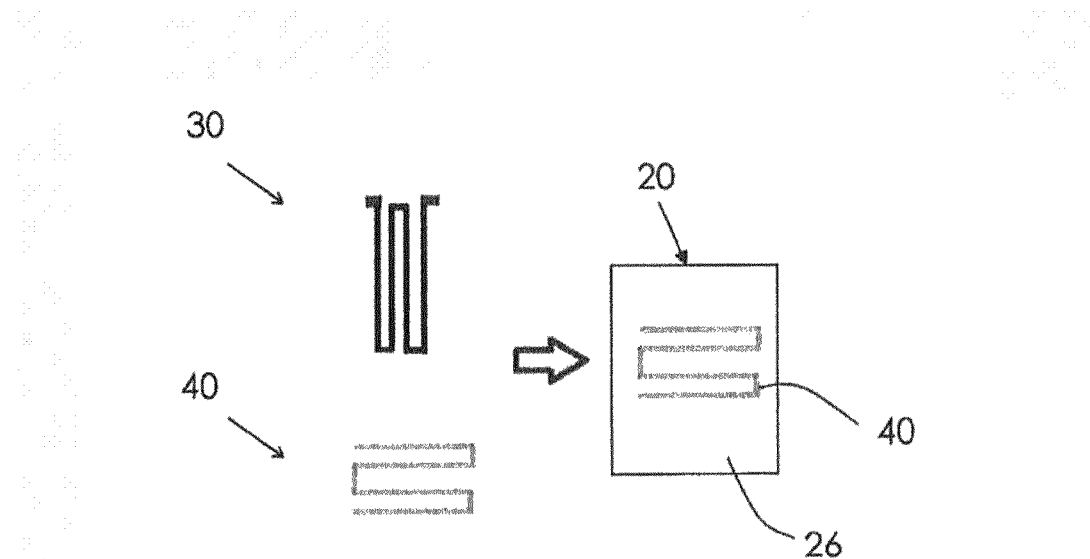
FIG. 6 is a schematic illustration showing a single-layer non-metallic conductor with a non-conductive layer, which under x-ray only displays the non-conductive layout.

FIG. 6 is a schematic illustration showing a single-layer conductor 30 with a non-conductive layer 40, which under x-ray only displays the non-conductive layout 40. The conductor 30 may be a non-metallic conductor. In FIG. 6, the use of non-metallic conductors 30 combined with x-ray imageable non-conductive patterns 40, produce an image of only the non-conductive patterns in x-ray image. This would give false information to hackers attempting to tamper the security circuit of security wrap 20.

Figure 7:
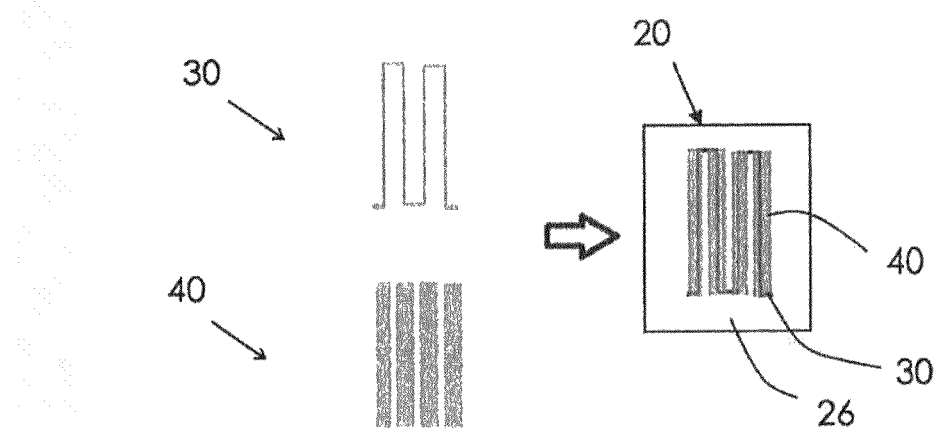
FIG. 7 is a schematic illustration showing a single-layer conductor with a non-conductive layer, which under x-ray is displayed as overlapped circuits.

FIG. 7 is a schematic illustration showing a single-layer conductor 30 with a non-conductive layer 40, which under x-ray is displayed as overlapped circuits. In FIG. 7, a single-layer metallic conductor 30 is combined with a non-conductive layer 40, in which case, the selected or all non-conductor traces is broadly based on conductor layer 30 design. Under x-ray the image is displayed as a fattened traced with very narrow spaces. With less space between traces, it means harder access by mechanical drilling or laser cutting.

Figure 8:
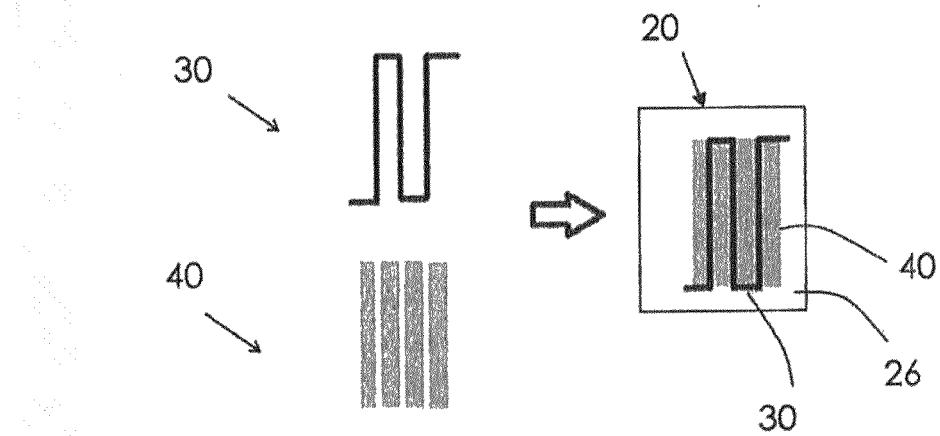
FIG. 8 is a schematic illustration showing a single-layer conductor with a complementary non-conductive layer, which under x-ray is displayed as a nearly fully covered security circuit.

FIG. 8 is a schematic illustration showing a single-layer conductor 30 with a complementary non-conductive layer 40, which under x-ray is displayed as nearly fully-covered security circuit 26. In FIG. 8, a single-layer metallic conductor 30 is used with a complementary non-conductive layer 40. In other words, non-conductor x-ray layer 40 is designed as negative image of the conductive layer 30. By precision registration, the conductor patterns and non-conductive patterns are over-laid to provide nearly 100% coverage under x-ray detection.

Figure 9A:
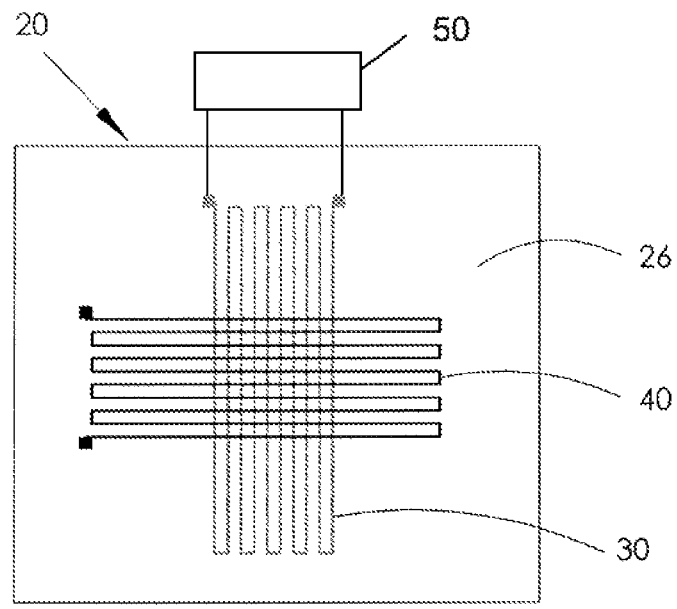
FIG. 9A is an optical photograph taken of a sample substrate having a single-layer conductor (vertical lines) with non-conductive layer (horizontal lines) printed over an opaque substrate.
Figure 9B:
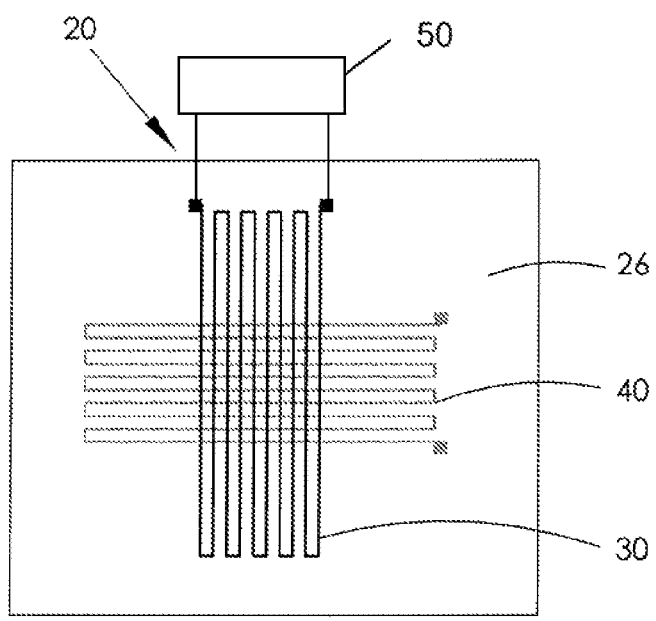
FIG. 9B is an x-ray image taken of the sample of FIG. 9A.

FIGS. 9A and 9B are images of an actual circuitry sample made with a silver conductive ink and a non-conductive zinc ink. Visually a single-layer conductor (vertical lines) with non-conductive layer 40 (horizontal lines) can be seen if they are viewed from the circuit side. The substrate here is a white coloured PET, so the circuit patterns are invisible if viewing from the PET side. Under x-ray detection, both conductor and non-conductive layers are shown in the x-ray image. Although electrically this is a single layer circuit, it exhibits as cross-overed double layer circuit 26 under x-ray. In FIG. 9B x-rays were emitted from the circuit side and the image was recorded from the substrate side, thus FIGS. 9A and 9B appear as mirror images.

Figure 10:
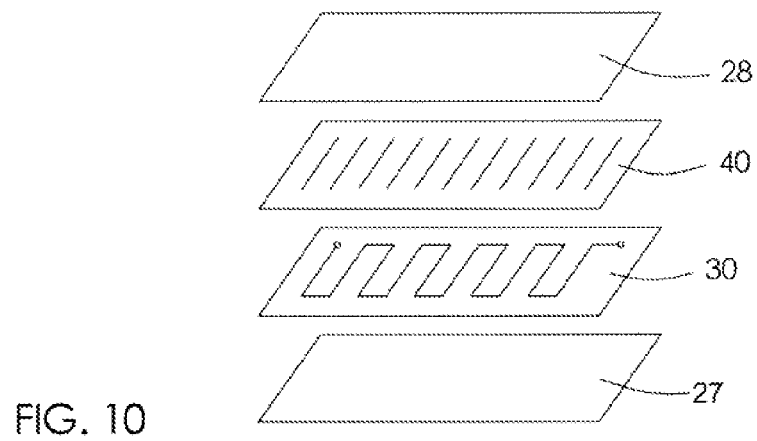
FIG. 10 is an exploded view of a two layer security wrap.
Figure 11:
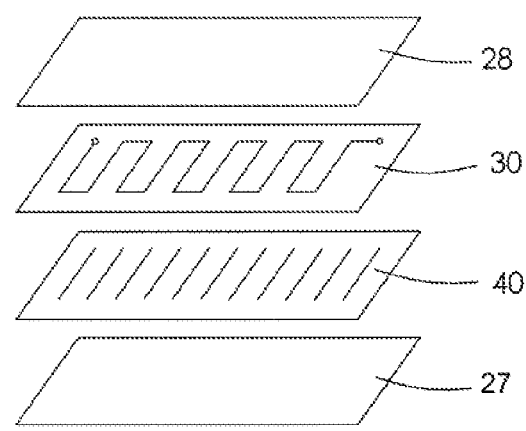
FIG. 11 is an exploded schematic view of a security wrap according to another embodiment.
Figure 12:
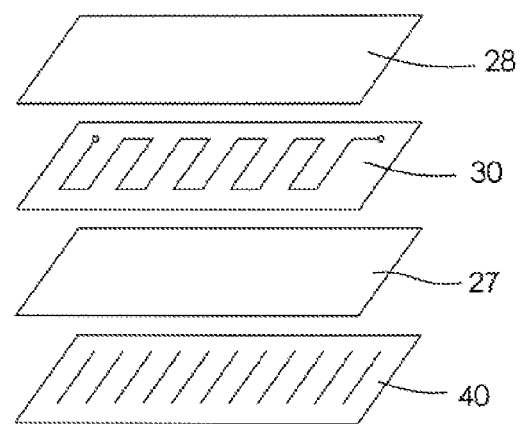
FIG. 12 is an exploded schematic view of a security wrap according to yet another embodiment.

FIGS. 10 to 12 illustrate the stack up of three embodiments of a security wrap 20 using a decoy layer. The figures are exploded schematic views and not drawn to scale.

In FIG. 10, the substrate 27 is on the bottom, the security screen 30 is printed or formed on the substrate 27 and the decoy layer 40 is formed on the security screen 30. The adhesive layer 28 is on top.

In FIG. 11, the substrate 27 is on the bottom, the decoy layer 40 is formed on the substrate 27 and the security screen 30 is printed or formed on the decoy layer 40. The adhesive layer 28 is on top.

In FIG. 12, the security screen 30 is printed or formed on a first side of the substrate 27 and the decoy layer 40 is formed on a second side of the substrate 27 remote from the security screen 30. The adhesive layer 28 is on top of the security screen 30.

Figure 13:
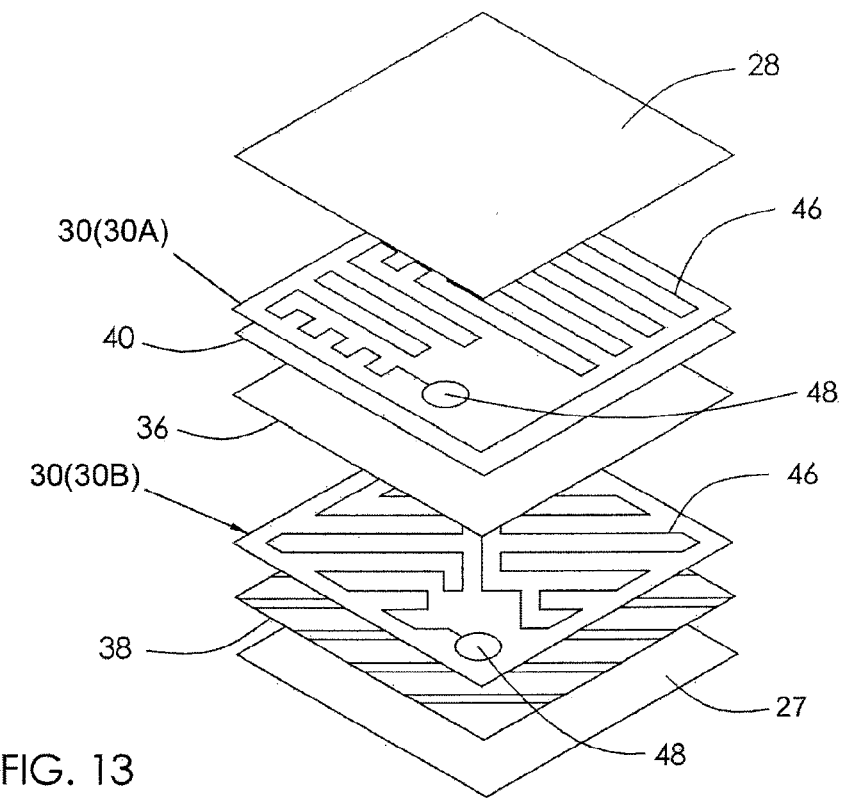
FIG. 13 is an exploded schematic view of a security wrap according to a further embodiment.

For a multi-layer security wrap 20, meaning a security wrap 20 with more than one security screen 30, as shown for example in FIG. 13, the arrangement is similar, except that each additional security screen 30 is printed on to a dielectric layer 36 printed on the preceding security screen 30. In this case the substrate 27 and first security screen 30A may be a flexible printed circuit (FPC) with the subsequent security screens 30B being formed using the printed conductive inks technology. For a multi-layer security wrap 20 with breakable conductors, an intermittent layer of adhesive modifier 38 is applied between the substrate 27 and the first security screen 30A and between the dielectric layers 36 and the subsequent security screens 30B.

The decoy layer 40 may be applied to the first or second security screen 30 as per the FIG. 10 embodiment, applied between the substrate 27 and the first security screen 30 as per the FIG. 11 embodiment, between the dielectric layer 28 and the second security screen as shown in FIG. 13, or to the outer surface of the substrate 27 as per the FIG. 12 embodiment.

The decoy layer 40 may be formed using a printing process to deposit lines or areas of x-ray impervious ink on a dielectric layer 28 covering the security screen 30, or if the ink is non-conductive, the decoy layer 40 may be printed directly onto the security screen 30 or the substrate 27. As an alternative, the decoy layer 40 may be applied to the outer surface of the substrate 27, remote from the security screen 30.

Figure 14:
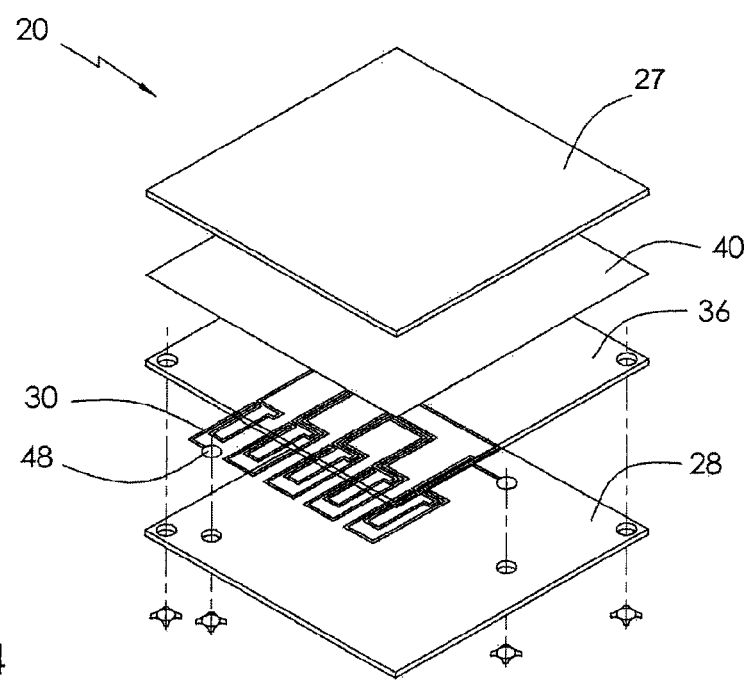
FIG. 14 is an exploded view of a security wrap according to a further embodiment.

In FIG. 14, the decoy layer 40 is a solid layer of conductive material. This has the advantage of not only shielding the security screen 30 and component layout from x-ray imaging but also provides a shield against electromagnetic (EM) or radio frequency (RF) signals, thus preventing a hacker from 'listening' to the information being transferred to or read by the MCU.

The general principles of construction are common for each embodiment. The security wraps 20 have a substrate 27, a security screen 30, a decoy layer 40 and a layer of adhesive 28 to bond the security wrap 20 to the parent device 16. The order and number of the layers may change depending on the application and security level required. Additionally, in some embodiments a dielectric layer 36 may be used to provide insulation between adjacent conductive layers 30.

The substrate 27 is preferably flexible to allow it to wrap around the parent device 16. Typically the substrate 27 is a PET film but other polymer films such as polycarbonate, PEN, polyimide and PVC may be used. The substrate 27 may be clear or opaque and pigmented, for example black or white.

The security screen 30 is preferably composed of a pattern of one or more conductive traces or conductive path or conductive track 46 formed by thermoset or thermoplastic conductive ink printed over the substrate 27 in variable trace widths and serpentine mesh patterns forming an electrically conductive path between a pair of screen terminals 48. Preferably, the screen terminals 48 are simply the ends of the conductors 46. A single layer security screen 30 may have one, two or more conductors interconnecting respective pairs of screen terminals. The fillers in the conductive ink can be silver, silver coated copper or gold, etc., which are x-ray detectable.

The conductive inks can be silver, silver-coated copper or gold containing conductive or resistive ink, each with specific properties that suit the necessary requirement for the operation and functionality of the security wrap 20 flexible circuit. Multiple layers can be printed in total isolation or connected at specific points depending on the intended functionality of the security wrap flexible circuit. With metallic powder, the conductive ink is x-ray imageable.

The conductive ink can also be carbon, graphite, clear conductive polymer or other conductive or resistive ink, each with specific properties that suit the necessary requirement for the operation and functionality of the security wrap flexible circuit. With these non-metallic conductive particles, the conductive ink and thus the security screen 30, is invisible under x-ray.

The dielectric layer 36 is preferably, a UV curable ink system with electrically insulative properties and is used as a separating medium to permit multiple layers of conductive ink or multiple security screens 30 to be printed on a single substrate 27. For example, the dielectric layer may be applied directly over a first security screen 30 by a printing process to insulate the first security screen 30 from a second security screen 30 or from other conductive circuit components, either of the security wrap or the parent device 16. The dielectric layer 36 is not necessary in a security wrap 20 having a single layer security screen 30 and a non-conductive decoy layer 40.

The dielectric layer 36, depending on security wrap functionality, can be printed partially or fully over the top of a conductive ink trace pattern to enable a subsequent conductive layer 30 to be printed but remain electrically isolated from the first where necessary. A number of conductive ink/dielectric ink layers can be printed in succession. The dielectric layer 36 is typically not detectable under x-ray.

The decoy layer 40 may be a layer of ink applied in a predetermined pattern to the substrate 27 or security screen 30. Preferably the decoy layer 40 is disposed between the substrate 27 and the security screen 30. The ink may be conductive or non-conductive. Where the decoy layer 40 is conductive, it needs to be isolated from the security screens 30 preferably by a dielectric layer 36. Conductive inks may be similar to the inks used for the security screen 30.

The non-conductive ink, which is x-ray imageable, is preferably a UV or thermal-curable screen ink system with electrically insulative properties and used as an x-ray imageable medium to hide the actual conductive layout when hacked by x-ray detection. The non-conductive ink typically consists of filler and polymer binders. There are three type of fillers that can be used for this invention:

1) Non-conductive metal powders, which include but not limited to zinc, iron, copper etc. Although these materials are conductive in bulk, they become non-conductive in the fine powder form due to surface oxidation. The filler loading range in the ink could be from 1-99% by weight. 40-90% is preferred to achieve both good x-ray image quality and ink printability.

2) Non-metallic but x-ray imageable materials, which include Barium sulphate etc. The filler loading range could be from 1-99% by weight. 40-90% is preferred to achieve both good x-ray image quality and ink printability.

3) Conductive metals but use lower loading below percolation threshold, so the formulated ink is non-conductive after curing. For silver, the percolation threshold is around 40-60% depending on different polymers. To achieve non-conductive function, less than 40%/o loading is preferred.

The adhesive layer 28 is preferably a pressure-sensitive adhesive (PSA), typically an acrylic adhesive that forms a bond between surfaces when pressure applied. The adhesive may be applied as an adhesive ink or as a laminate. Depending on the parent substrate 16 to which the security wrap 20 is adhered a variant PSA with specific adhesion properties can be used. This can be a bespoke PSA specifically developed for a specific bonding requirement. The adhesive layer is typically not visible under x-ray.

During assembly, the conductive traces 46 are attached to the substrate 27 via screen printing methods. Although non-conductive x-ray imageable ink can be printed before or after the conductive ink traces are laid down, it is preferred to print the non-conductive ink over the conductive ink, so it has no impact on the conductivity of conductive traces.

The adhesive layer 28 is attached by applying pressure. The security wrap 20 is attached to the parent device 16 via the adhesive layer 28 by applying pressure.

As shown in FIG. 5-8, the non-conductive x-ray imageable layers 40 (decoy layers) can be printed partially or fully over the top of a conductive silver trace pattern 30. In all cases, the trace coverage on the substrate 27 appears to be increased under x-ray detection, which helps hide the actual circuitry layout and provides increased difficulty against tampering.

Alternatively, the substrate 27 and the security screen 30 can be produced as a flexible printed circuit (FPC), with the security screen 30 being formed by etching a copper layer fixed on the substrate 27. To prevent copper oxidation, a dielectric layer such as solder mask or overlay is applied over copper traces, and exposed copper pads are typically surface-treated with tin, nickel or gold etc. Similarly the x-ray imageable, non-conductive ink can be printed on solder mask or overlay to form a decoy layer 40.

In case of assembly design with breakable conductors, the security function against peeling is not affected by adding the non-conductive x-ray layers 40. When hackers attempt to remove the security wrap 20 from the parent device 16, the conductive ink traces 46 are disturbed, thus creating a resistance change or a complete open circuit at the weak points. This occurrence effectively changes the electrical state of the conductive trace and prompts the monitoring systems of the parent device 16 to initiate an alarm response from an alarm circuit 50, which may include erasure of secure or personal data as necessary.

In operation, a conductive ink is screen printed onto a substrate 16, in a pattern to meet specific electrical requirements. A non-conductive x-ray imageable ink is printed subsequently over the conductive traces. A pressure-sensitive adhesive (PSA) is laminated over both the conductive and non-conductive ink patterns by means of a laminating roller. The security wrap 20 is profile cut to a custom-made shape ready to be assembled to a parent device 16 which might be in the form of a printed circuit board, an open face or a complete plastic enclosure. The security wrap 20 is assembled to a device 16 either by hand or some mechanical means dependant on the assembly process.

When the circuits of the security screen are detected by x-ray, the x-ray images of the decoy layer can hide the actual conductive traces of the security screen.

Security wraps 20 with decoy layers 40 which modify and thus falsify or hide x-ray images of the circuitry 30 of the security wrap 20 renders x-ray hacking ineffective. When both non-conductive layers 40 and actual conductive layers 30 are formed on a flexible substrate 27, the x-ray images could display like multi-layer designs, or form broadened conductor traces, or appear as a completely solid coverage.

Increased security can be achieved by printing one or more non-functional layers. For a security screen 30 using printed silver for its conductor, the non-functional decoy layers 40 can be printed using similar equipment and process. In case of copper-based FPC circuit, the non-functional decoy layer can be printed over FPC layers after wet-chemistry process is complete. These x-ray imageable non-functional layers (decoy layers 40) use no precious metal, and the applying method is an environmental friendly additive process, which is cost-effective to improve the security level against x-ray detection.

A security wrap may consist of breakable conductors, which are to designed to prevent circuitry tampering by mechanic peel or shearing. The method described here against x-ray tampering can also be applied on flexible circuits or security wraps with breakable conductors, by which the final circuitry would have combined security features.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, although the invention has been described using a decoy layer providing a false x-ray image of the security screen layout, if the screen is made using non-metal or x-ray invisible conductive ink to form the conductive traces, no decoy layer would be required.

The invention claimed is:

1. A security wrap for protecting an electronic component, comprising:

a polymer film substrate having a first side and a second side opposite to each other;

a first security screen disposed over the first side of said substrate and including a pair of screen terminals and a conductive path between the pair of screen terminals;

a layer of adhesive over the first side of said substrate and bonding the first side of said substrate to the electronic component with said first security screen sandwiched therebetween;

a decoy pattern at least partially impervious to X-ray and overlaying said first security screen;

a dielectric layer disposed between said first security screen and the first side of said substrate; and a second security screen disposed between said dielectric layer and the first side of said substrate and including a second pair of screen terminals and a second conductive path between the second pair of screen terminals.

2. The security wrap of claim 1, wherein the conductive path of said first security screen and the second conductive path of said second security screen are connected in series with each other.

3. A security wrap for preventing unauthorized access to a device having an alarm circuit and components mounted on a printed circuit board (PCB), comprising:

a polymer film substrate having a first side and a second side opposite to each other;

a first security screen disposed over the first side of said substrate and including a pair of screen terminals coupled to the alarm circuit of the device and a conductive path between the pair of screen terminals;

a layer of adhesive covering the first side of said substrate and bonding the first side of said substrate to the PCB of the device with said first security screen sandwiched there between;

an X-ray impervious pattern overlaying the conductive path of said security screen;

a dielectric layer disposed between said first security screen and the first side of said substrate; and a second security screen disposed between said dielectric layer and the first side of said substrate and including a second pair of screen terminals coupled to the alarm circuit of the device and a second conductive path between the second pair of screen terminals.

4. The security wrap of claim 3, wherein the conductive path of said first security screen and the second conductive path of said second security screen are connected in series with each other.

5. The security wrap of claim 3, wherein said X-ray impervious pattern is formed on said substrate.

6. The security wrap of claim 3, further comprising a layer disposed over said first security screen, wherein the X-ray impervious pattern includes a pattern formed on said layer and insulated from the conductive path of said first security screen.

* * * * *